United States Patent
Benz et al.

(10) Patent No.: US 6,280,671 B1
(45) Date of Patent: Aug. 28, 2001

(54) PROCESS FOR PREPARING MULTILAYER PLASTIC COMPOSITES OF INCOMPATIBLE PLASTICS

(75) Inventors: Volker Benz, Hoechst; Hans Lorenz, Darmstadt; Michael Meier-Kaiser, Pfungstadt; Michael Mueller, Bensheim; Klaus-Ernst Poehlmann, Darmstadt, all of (DE)

(73) Assignee: Roehm GmbH Chemische Fabrik, Darmstadt (DE)

( * ) Notice: Subject to any disclaimer, the term of this patent is extended or adjusted under 35 U.S.C. 154(b) by 0 days.

(21) Appl. No.: 08/396,645

(22) Filed: Mar. 1, 1995

Related U.S. Application Data

(62) Division of application No. 08/286,514, filed on Aug. 5, 1994, now abandoned.

(30) Foreign Application Priority Data

Aug. 5, 1993  (DE) ................................................ 43 26 232

(51) Int. Cl.⁷ ........................................................ D01D 5/32
(52) U.S. Cl. ................ 264/172.14; 264/172.15; 264/177.1; 264/211.22
(58) Field of Search .................... 264/167, 171, 264/555, 171.11, 172.14, 172.15, 177.1, 211.22; 425/132, 461, 463, DIG. 243

(56) References Cited

U.S. PATENT DOCUMENTS

| | | | |
|---|---|---|---|
| 3,557,265 | * 1/1971 | Chisholm et al. | ...... 264/47 |
| 4,058,581 | 11/1977 | Park . | |
| 4,592,938 | 6/1986 | Benoit . | |
| 5,002,712 | 3/1991 | Goldmann et al. . | |
| 5,019,439 | * 5/1991 | Momose | ...... 428/178 |
| 5,040,352 | 8/1991 | Oberlander et al. . | |
| 5,202,074 | * 4/1993 | Schrenk et al. | ...... 264/241 |
| 5,397,610 | 3/1995 | Odajima et al. . | |

FOREIGN PATENT DOCUMENTS

| | | |
|---|---|---|
| A-543 020 | 11/1955 | (BE) . |
| A-20 49 545 | 4/1971 | (DE) . |
| 38 35 575 | 4/1990 | (DE) . |
| 38 40 374 | 5/1990 | (DE) . |
| 0282199 | 9/1988 | (EP) . |
| 0407852 | 1/1991 | (EP) . |
| A-2 423 320 | 11/1979 | (FR) . |

OTHER PUBLICATIONS

Kirk–Othmer, *Encyclopedia of Chemical Technology*, 3rd Ed., vol. 18, John Wiley & Sons, NY, pp. 443–447 (1982).
Kirk–Othmer, *Encyclopedia of Chemical Technology*, 3rd Ed., vol. 18, John Wiley & Sons, NY pp. 720–755 (1982).
Patent Abstracts of Japan, vol. 14, No. 91 (M–938) (4034) Feb. 20, 1990.
Patents Abstract of Japan, vol. 8, No. 152 (M–309) (1589) Jul. 14, 1984.
Patent Abstract of Japan, vol. 11, No. 352 (M–643)(2799), Nov. 18, 1987, JP A 62 130821, Jun. 13, 1987.*

* cited by examiner

Primary Examiner—Merrick Dixon
(74) Attorney, Agent, or Firm—Oblon, Spivak, McClelland, Maier & Neustadt, P.C.

(57) ABSTRACT

Multilayer plastic composites containing at least two incompatible plastics, A and B, in which the layering sequence alternates between A and B, the layers of plastic B are discontinued at regular intervals, and the resulting gaps in the layers are filled in with plastic A, exhibit good adhesion between the layers. In preferred embodiments of the invention, the amorphous, crystalline, or semi-crystalline plastic B has a higher coefficient of thermal expansion than the amorphous plastic A. The plastic composite is preferably produced via coextrusion.

5 Claims, 2 Drawing Sheets

PROCESS FOR PREPARING MULTILAYER PLASTIC COMPOSITES OF INCOMPATIBLE PLASTICS

This is a Continuation, of application Ser. No. 08/286,514 filed on Aug. 5, 1994 now abandoned.

BACKGROUND OF THE INVENTION

1. Field of the Invention

The present invention relates to plastic composites made from at least two incompatible plastics, A and B, in a multi-layer composite, in which the layering sequence alternates between A and B, the layers of plastic B are discontinued at regular intervals, and the resulting gaps in the B layers are filled in with plastic A. The present invention also relates to methods and apparatus for preparing such multilayer plastic composites.

2. Discussion of the Background

Plastic composites are well known. The primary goal in their production is good adhesion between the composite elements. One of the technically important fields of this type of composites is the reinforcement of plastic sheets using fibers or bands.

For example, DE-OS 38 35 575 describes a method for producing continuous, molded elements from units made of reinforcement fibers that have been preimpregnated with thermoplastic plastics, in which the fibers are shaped by melting the thermoplastics. The preimpregnation results in a good adhesion of the reinforcement fibers in the thermoplastic matrix.

DE-OS 38 40 374 discloses thermoplastic fiber-reinforced composites, which can be obtained by preimpregnating reinforcement fibers with a molten mass of thermoplastics, polyamides, a low-molecular weight acid amide and, if necessary, a coupling agent, along with methods for producing these and possible applications. The composites are prepared by a process in which a mixture of thermoplastic, polyamide, acid amide, and, if necessary, a coupling agent in the form of a prefabricated film or a freshly extruded molten film is used and, together with the reinforcement fibers, which in this case are in the form of a mat or unidirectional filament strands, are fed into a continuous mold. In this case, as well, good adhesion between the fibers and the thermoplastic matrix is of great importance.

U.S. Pat. No. 4,058,581 describes a process for the continuous production of molded elements that are reinforced with graphite fibers, in which the individual graphite fibers are first drawn through a solution of a thermoplastic resin, preferably a polypropylene that is grafted with acrylic acid, to effect preimpregnation with a coupling agent.

In EP-A 0,282,199, a process for the production of fiber composites made of a thermoplastic matrix and unidirectional reinforcement fibers is described, in which the fibers are preimpregnated with molten thermoplastic. In this case, continuously parallel fiber bundles that are not connected mechanically and a thermoplastic plastic are fed into a twin mold, where they are subjected to great pressure at a high temperature for a specific amount of time, after which they are cooled. In this process the fibers are completely and simultaneously preimpregnated, which allows a high fiber content of greater than 50% by volume in the thermoplastic matrix. In this case as well, good adhesion between the fibers and the thermoplastic matrix is of primary importance.

EP-PS 0,407,852 describes sheets made of acrylic glass that are suitable for use as sound-proofing elements, and which have embedded in them, approximately in the center, monofilament synthetic fibers, or a lattice web made of such fibers, which are preferably polyamide fibers. The polyamide fibers show no appreciable loss in tear resistance, since the adhesion between these types of fibers and the acrylic glass that surrounds them is relatively light.

Up to EP-PS 0,407,852, the patent specifications and published applications referred to above describe exclusively plastic composites that include layers of coupling agents. The use of additional coupling agents generally necessitates great technical expenditure, for example on feed devices for the coupling agents or a special melting and/or extrusion guiding device in the case of coextruded plastic composites. In addition, the adhesion that can be obtained in the plastic composite over layers of coupling agent is limited.

Thus, there remains a need for a method for combining incompatible plastics, and more importantly their mechanical properties, without the use of coupling agents. The application referred to above, EP-PS 0,407,852, attains this object only to a limited extent and in a very complex manner, and the discontinuous production of the plastic composites made of acrylic glass and synthetic fibers is very costly.

SUMMARY OF THE INVENTION

Accordingly, it is one object of the present invention to provide novel multilayer plastic composites.

It is another object of the present invention to provide multilayer plastic composites which contain layers of at least two incompatible plastics.

It is another object of the present invention to provide multilayer plastic composites which contain layers of at least two incompatible plastics and which exhibit improved mechanical properties.

It is another object of the present invention to provide a novel method for preparing such multilayer plastic composites.

It is another object of the present invention to provide novel apparatus for preparing such multilayer plastic composites.

These and other objects, which will become apparent during the following detailed description, have been achieved by the inventors' discovery that multilayer plastic composites made of at least two incompatible plastics, A and B, can be produced if the layering sequence alternates between A and B, and if the layer of plastic B is discontinued at regular intervals and the resulting gaps in the layer are filled in with plastic A. In a preferred embodiment of the invention, the layers of plastic B are inserted as unidirectional columns in the plastic A.

In a further preferred embodiment of the invention the plastic B has a greater thermal expansion than the plastic A, whereby the plastic A is most preferably amorphous and the plastic B is most preferably amorphous, crystalline, or semi-crystalline. The composites are preferably produced via coextrusion, in which the plastic B is most preferably processed in an oscillating stream, which results in periodic changes in the cross-sections of the layer segments made of plastic B.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

The thermoplastic plastics A and B are chosen such that the blending of the two polymers (plastics) is fundamentally incompatible. Incompatible polymer blends are designated, for example, as mechanical polymer blends (see, e.g., Kirk-Othmer, *Encyclopedia of Chemical Technology*, 3rd. Ed., Vol. 18, pages 443 to 447, Wiley Interscience, NY, 1982). This places very few limitations on the possible selections for plastics A and B.

Preferably, the thermoplastic plastic A is amorphous and has a lower coefficient of thermal expansion than the plastic B, which can be amorphous, semi-crystalline, or crystalline. The plastic B preferably has greater elongation at a break (fracture), greater transversal stability, and a higher viscosity than the matrix plastic A.

The following are possible examples of amorphous plastics for A or B: polyvinyl ester, polyvinyl ether, amorphous polyvinyl halogenides, polystyrenes, polyphenylene oxides, polyphenylene sulphides, polycarbonates, polysulphones, amorphous polyamides, polyether ketones, polyether ether ketones, polyether sulphones, polyimides, polyetherimides, polyfluoroalkenes, polyester carbonates, amorphous polyolefins, and most particularly preferred, poly(meth) acrylates.

Examples of crystalline or semi-crystalline B plastics are polymers whose crystallinity is contingent upon a uniform tacticity or enough small substituents, to permit at least the partial formation of a crystal lattice. Examples of such polymers include polyester, crystalline polyolefins, crystalline polyvinyl halogenides, liquid crystalline polymers having mesogenic groups in the main and/or lateral chains, or most preferably, crystalline polyamides. Regarding the production and characterization of the A and B plastics, see, for example, Kirk-Othmer, *Encyclopedia of Chemical Technology*, 3rd. Ed., Vol. 18, pages 720 to 755, Wiley Interscience, NY, 1982.

There is no particular limitation on the molecular weight of the thermoplastics A and B, so long as the thermoplastics A and B can be processed to form the present multilayer composites. Typically, the thermoplastic A and B will have number average molecular weights of $10^3$ to $10^6$ daltons, preferably $10^4$ to $5\times10^5$ daltons.

Figure 1:
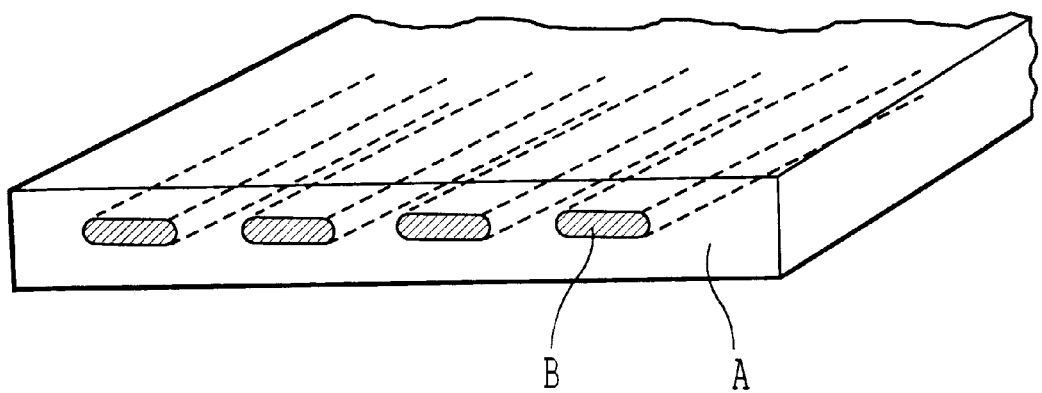
FIG. 1 illustrates a first embodiment of the present multilayer plastic composite.

FIG. 1 illustrates the fundamental structure of a three-layer plastic composite, comprised of an amorphous plastic A and an amorphous, crystalline, or semi-crystalline plastic B, having the layering sequence A-B-A. The B layer is discontinued at regular intervals, and the resulting gaps are filled in with plastic A, thereby ensuring a strong adhesion between the two A layers.

In the embodiment shown in FIG. 1, the multilayer composite is in the form of a flat sheet. However, it is to be understood that the composite may also take the form of other shapes, such as a hollow pipe, curved sheet, etc.

In the embodiment shown in FIG. 1 two layers of plastic A are sandwiched about a single layer of B. However, it is to be understood that the composite may contain additional layers, so long as the layers of plastic A and plastic B alternate. In general, for every n layers of plastic B there will be n+1 layers of plastic A. Although, there is no particular limit on the number of layers of A and B in the present composite, for the sake of convenience of manufacture, it is preferred that n be less than 3, and it is particularly preferred that n be 1.

Although there are no particular limitations on the absolute or relative dimensions of the layers of A and B, in embodiments in which two layers of A are sandwiched about a single layer of B, such as shown in FIG. 1, the overall thickness of the composite is typically 0.5 to 25 mm, preferably 1 to 20 mm; the thickness of the B layer is 0.1 to 22 mm, preferably 0.2 to 20 mm; the gaps in the B layer are 1 to 100 mm, preferably 5 to 50 mm, wide; and the distance between nearest neighbor gaps in the B layer (cross-sectional width of individual segments in B layer) is 1 to 50 mm, preferably 2 to 30 mm. Of course, in embodiments comprising additional layers of A and B, the overall thickness of the multilayer composite will increase in proportion to the number of additional layers of A and B.

In a preferred embodiment, the plastic B has a greater coefficient of thermal expansion than the plastic A. As a result, when the layers of the plastic B, which are embedded in the plastic A, cool, the greater thermal shrinkage of the plastic B causes the layers of the plastic B to become tightened. This results in advantageous mechanical properties in the plastic composite, such as a greater resistance to fracture, greater transverse strength, greater dimensional stability, and the prevention of shattering under impact stress.

Figure 2:
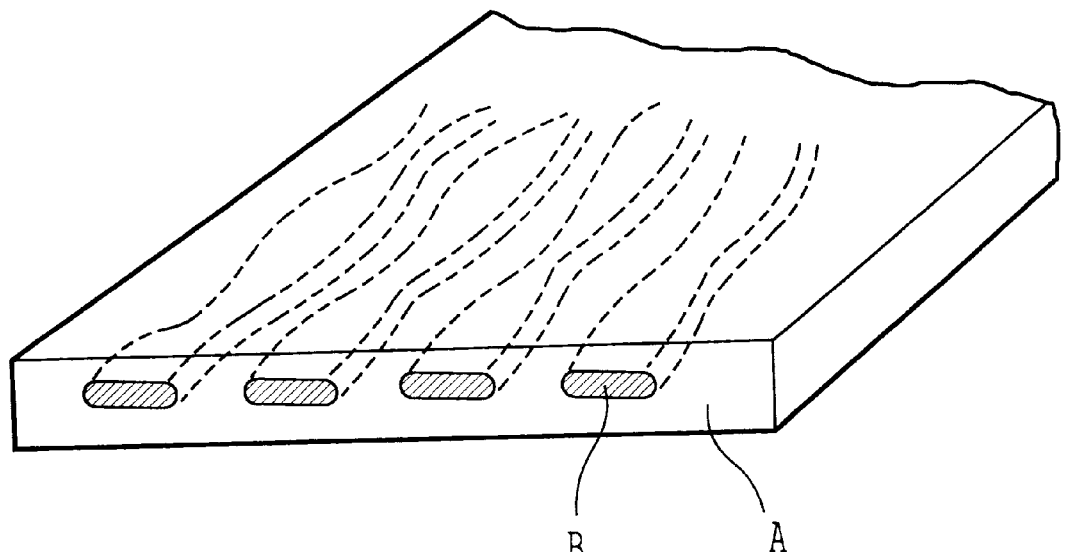
FIG. 2 illustrates a second embodiment of the present multilayer plastic composite.

A further advantageous embodiment of the invention involves an insertion of segmented layers of the plastic B, the cross-sections of which vary periodically, resulting in an excellent anchoring of the layers of the plastic B in the plastic A (see FIG. 2). In this case, as before, the tightening of the layers of the plastic B upon cooling is increased substantially, which adds to the mechanical advantages of the plastic composite already outlined above.

In the embodiment shown in FIG. 2, there is no particular limit on the degree of variation of the cross-sectional width of the segments in layer B. However, good results have been achieved when the variation is 5 to 100%, preferably 5 to 50%, based on the minimal cross sectional width of an individual segment of layer B, and the period of this variation is typically 10 to 100 mm, preferably 20 to 50 mm.

The present multilayer composites may be used, e.g., as window panes. If a transparent plastic A and a non- or semi-transparent plastic B are used, the result is a plastic composite having a shading effect, which can be used in the manufacturing of sun shades.

By using varying colors of plastics A and B, plastic composites for use in luminous advertising or for other possible applications in the lighting and decorating field can be produced.

The plastic composites of the present invention, made preferably of amorphous plastic A and amorphous, crystalline, or semi-crystalline plastic B, are preferably produced relatively simply in a single production stage via coextrusion.

Figure 3:
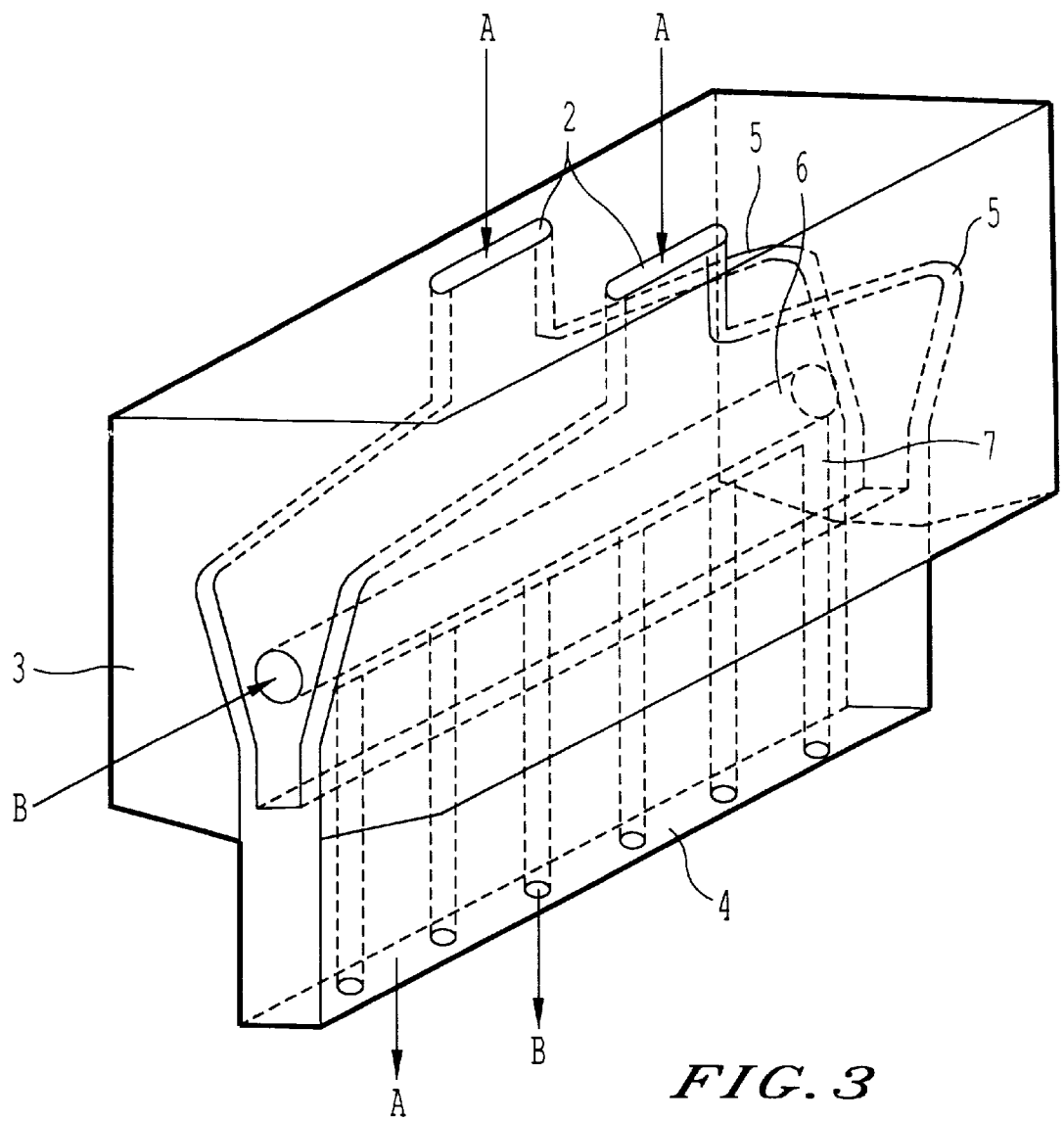
FIG. 3 illustrates an embodiment of the apparatus useful for producing the present multilayer plastic composite.

FIG. 3 illustrates the main section of the device used in producing the present composites, the so-called coextrusion die. In the die shown in FIG. 3, the plastic A is fed in at the feed points (2) and is then dispersed in two separate distribution channels (5) to the desired product width. Between the distribution channels (5) for the plastic A, the plastic B is fed at the feed point (3) into a bore hole (6) that has a lateral distribution. The plastic B exits this bore hole via a larger number of bore holes (7), which correspond to the number of segments of B in the A matrix. At the point at which B emerges from the bore holes, the two layers of A are also joined, thereby enclosing the columns of plastic B.

The cross-sectional shape of the B segments in A is largely dependent upon the shape of the bore holes (7) at their points of efflux and the relative viscosities of the plastics A and B. If the viscosity of B is greater than the viscosity of A, then the segments of B and A will be more round cross-sectionally; if these viscosity ratios are reversed, the segments will be more flat.

After it has exited the die, the composite can be sized using a conventional smoothing device. Because the plastic B is enclosed in the plastic A, it cools relatively slowly. If the plastic B is semi-crystalline or crystalline, this process results in substantially greater degrees of crystallinity than if the B columns had been produced via conventional extrusion. If a periodic variation in the cross-sectional width of the B segments over their entire length is desired, this can be easily achieved by periodically altering the feed rate of the stream of the plastic B that is fed into the feed points (3). Because the plastic B has a higher thermal expansion than the plastic A, the B segments become tempered with the mold closure between the two plastics (comparable with reinforced concrete). This permits a further improvement in the mechanical properties of the composite.

Other features of the invention will become apparent in the course of the following descriptions of exemplary embodiments which are given for illustration of the invention and are not intended to be limiting thereof.

EXAMPLES

If a steel ball bearing having a diameter of 100 mm (weight approx. 4 kg.) is allowed to impact on an 8 mm thick, flat sheet made of polymethyl methacrylate (PMMA, Plexiglass® 7H, Man. Röhm) from a height of 1.5 m at a 45 degree angle, the ball bearing will break through the sheet, forming many large splinters.

If the same experiment is conducted using a sheet as specified in the invention, in which the plastic A is PMMA (Plexiglass® 7H Man. Röhm, coefficient of thermal expansion $\alpha_1 = 1.8 \times 10^{-4}$ $K^{-1}$ at 120° C.) and the plastic B is polyamide 12 (Vestamide® 1852 Man. Hüls AG, coefficient of thermal expansion $\alpha_2 = 2.7 \times 10^{-4}$ $K^{-1}$ at 120° C.), and in which the B segments are spaced at 30 mm intervals and have an oval cross-section with an average diameter of 3 mm, then the sheet will only be cracked superficially and dented toward the rear at the point of impact of the ball bearing; the ball bearing will be halted and no splinters will form.

If the height of fall of the ball bearing is increased to 2.2 m for the sheet specified in the invention, the ball bearing will break through the sheet. However, all splinters will be contained. The properties described can be further improved by using B segments having a cross-section that varies periodically over the length of the segments and a resulting mold closure between A and B.

The coefficient of thermal expansion a is determined in accordance with DIN 53752.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for producing a multilayer plastic composite, said composite comprising a sequence of layers of at least two incompatible thermoplastic plastics, A and B, wherein said sequence of layers alternates between A and B, a layer of plastic B is discontinuous at regular intervals to form gaps in said layer of plastic B, and said gaps in said layer of B are filled in with plastic A;

said method comprising coextruding plastic A and plastic B through a die comprising a pair of parallel exit slits and a plurality of exit ports, with a gap between each port, located between said pair of parallel exit slits, said plurality of exit ports being evenly spaced along a line parallel to said pair of exit slits, wherein said coextruding plastic A and plastic B comprises forming a pair of fluid streams of said plastic A by passing a fluid stream of plastic A through said pair of parallel exit slits and forming a plurality of fluid streams of plastic B with gaps between each stream of said plastic B by passing a fluid stream of plastic B through said plurality of exit ports, so that said fluid streams of said plastic A exit said pair of exit slits and said fluid streams of plastic B exit said plurality of exit ports in such a manner to result in a portion of said fluid streams of said plastic A passing through said gaps between each stream of said plastic B to effect fusion of said pair of fluid streams of said plastic A, to obtain said composite.

2. The method of claim 1, wherein said plastic B has a greater coefficient of thermal expansion than said plastic A.

3. The method of claim 1, wherein said plastic A is amorphous, and said plastic B is semi-crystalline.

4. The method of claim 1, wherein said plastic A is amorphous, and said plastic B is crystalline.

5. The method of claim 1, wherein said plastic A is amorphous, and said plastic B is amorphous.

* * * * *